Figure 5:
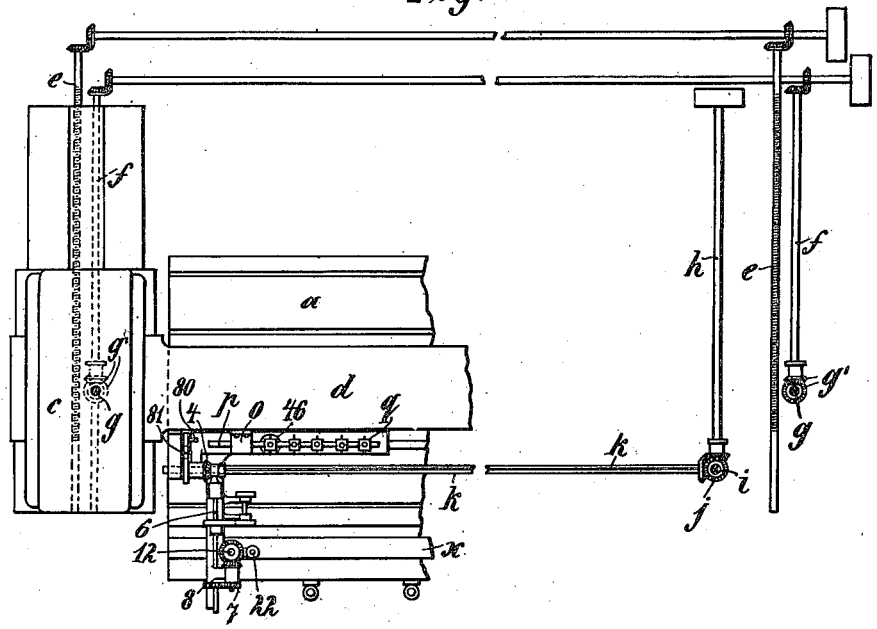

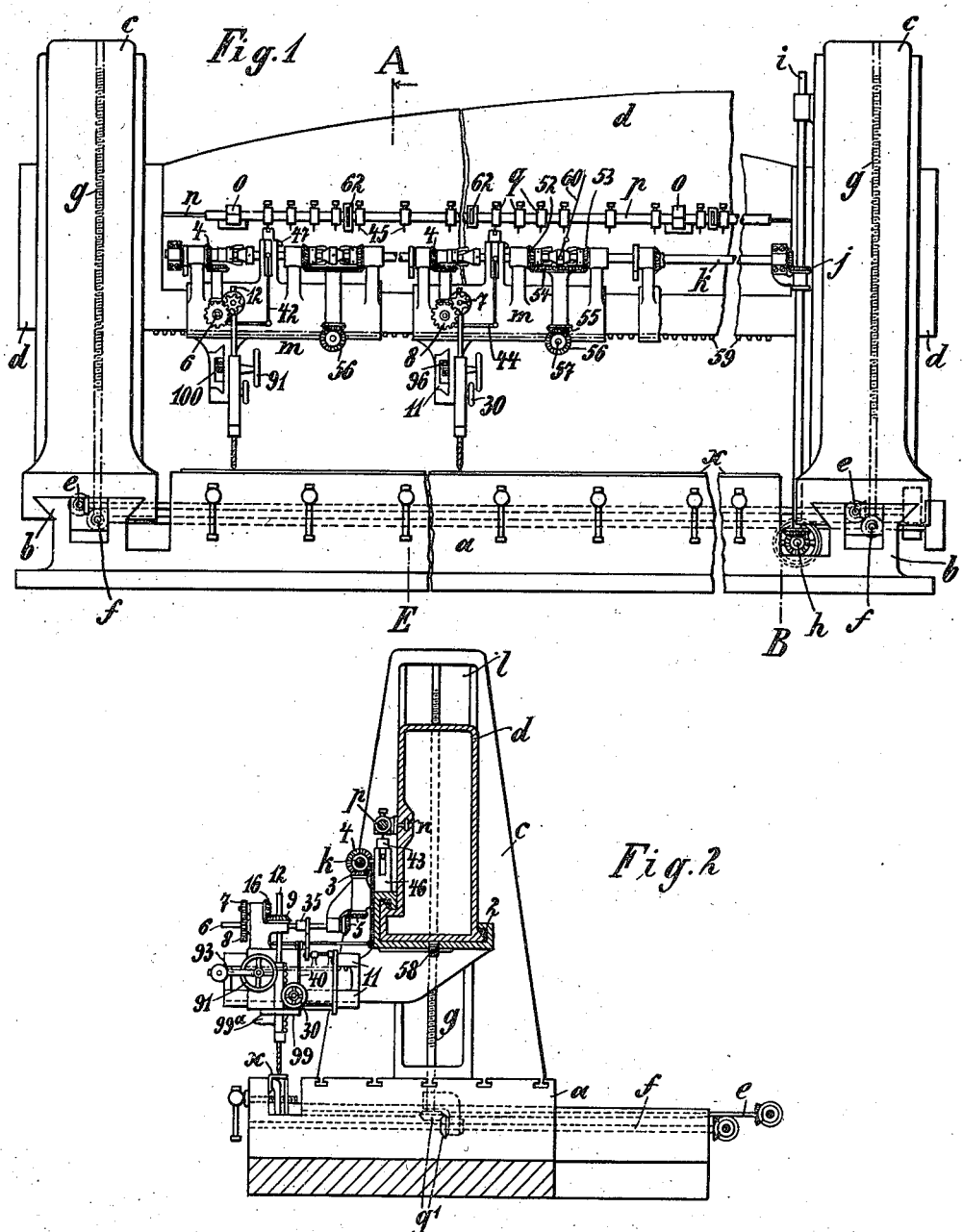

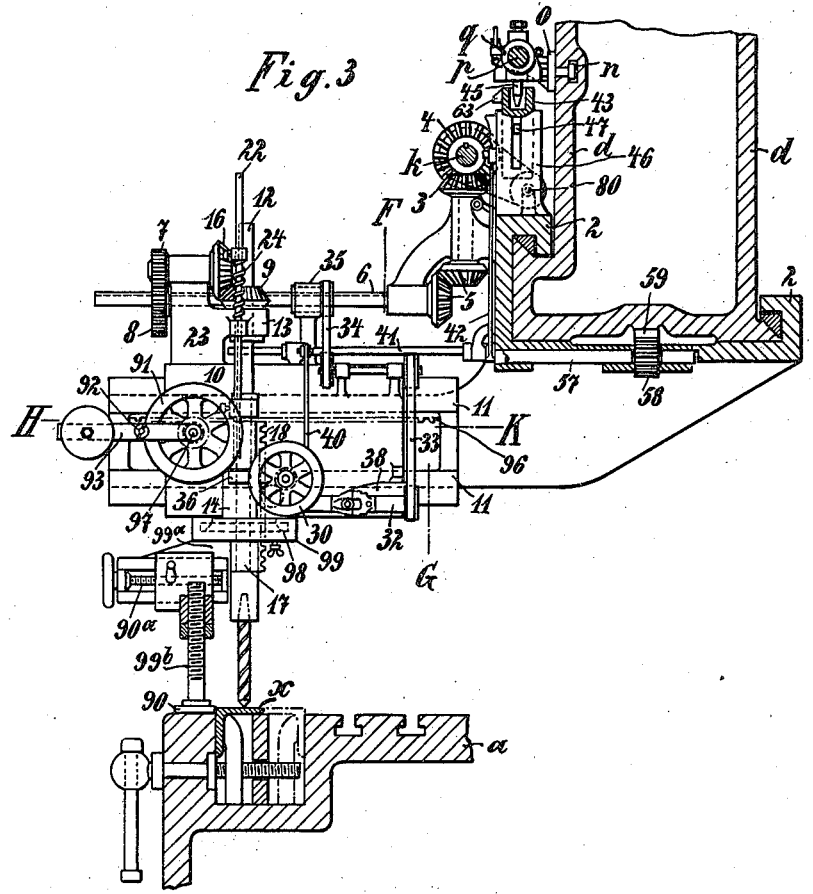
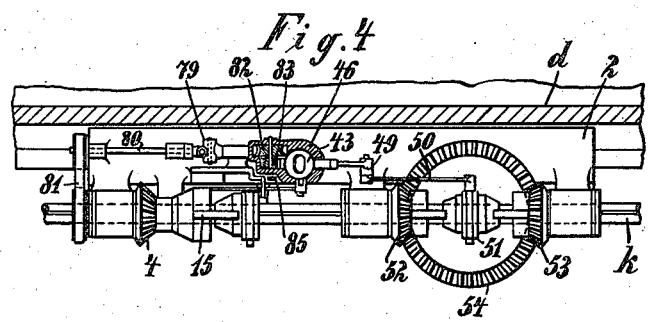

A. KOLASSA.
MACHINE TOOL.
APPLICATION FILED FEB. 8, 1912.

1,046,394.

Patented Dec. 3, 1912.
6 SHEETS—SHEET 3.

Witnesses:
Alfred R. Anderson
Cornelius Xoving

Inventor:
Anton Kolassa
By Ivan Dedennel
Attorney

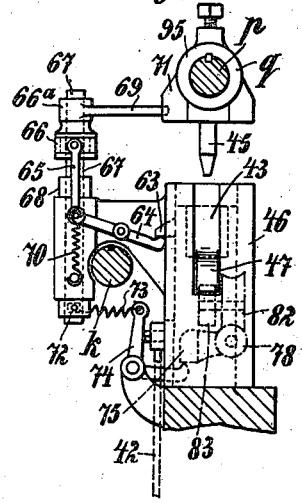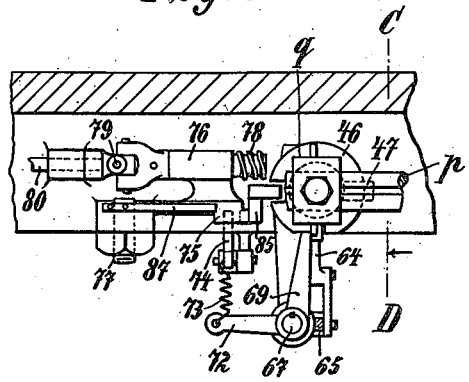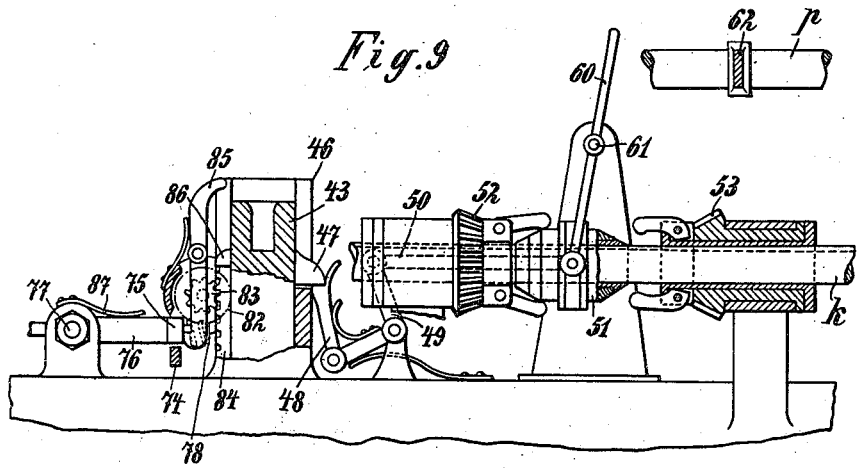

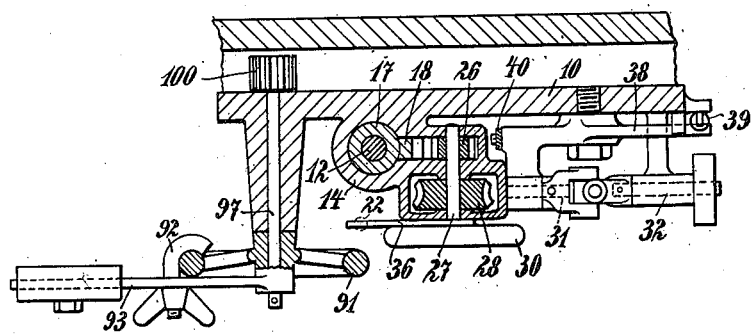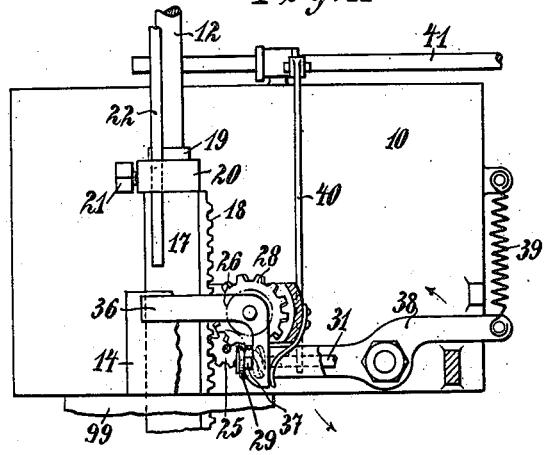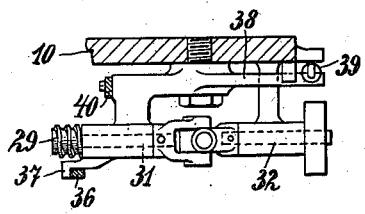

UNITED STATES PATENT OFFICE.

ANTON KOLASSA, OF VIENNA, AUSTRIA-HUNGARY.

MACHINE-TOOL.

1,046,394.

Specification of Letters Patent. Patented Dec. 3, 1912.

Application filed February 8, 1912. Serial No. 676,325.

*To all whom it may concern:*

Be it known that I, ANTON KOLASSA, a subject of the Emperor of Austria-Hungary, residing at Vienna, in the Empire of Austria-Hungary, have invented certain new and useful Improvements in Machine-Tools, of which the following is a full, clear, and exact description.

In order to produce an accurate boring, punching or stamping of a series of holes in rolled metal or the like, without first having to center the same, adjusting devices have hitherto been applied to machines of this class, by means of which, either the piece of work or the tool was first accurately adjusted to a predetermined position, so that the hole would be bored exactly at the required position. In machine tools of this class, it is of the greatest importance that the distance apart of the holes does not vary even to the extent of the fraction of a millimeter, so that in subsequently fitting the parts together the holes of the various members will register exactly. This accurate registering of the holes—whether the work was moved past the tools—drills or the like—or the latter moved over the fixed piece of work—has been attained, in connection with the known machine tools, by means of a series of stops arranged on detachable rails, in accordance with the series of holes to be produced and with which a series of vertically movable sleeves are adapted to coöperate. These sleeves were mounted either on the carriage for the piece of work or for the drilling mechanism and could only be moved on to the stops of the rail when the sleeve was in exact alinement with the stop. These machines were adjusted by hand, and the attendant had to effect the proper adjustment of the sleeve and stop each time by hand, so that the machine required constant attention. Thus the working of these machine tools was comparatively complicated and expensive as also slow, because the attendant could only supervise the boring of a single hole at one time.

The machine tool forming the object of the present invention works entirely automatically, so that when the stops have once been adjusted on the rail and the piece of work has been adjusted and clamped, it is only necessary to start the machine, when the whole series of holes, adjusted on the rail will be produced in the desired positions. In connection with the present machine it is also possible to employ a plurality of the boring or other tools which operate on one and the same piece of work, which greatly increases the speed of the work. The holes may be bored at different distances apart in one and the same piece of work and each tool may be independently and automatically stopped, so that great economy in labor is attained.

In order to render the present specification easily intelligible, reference is had to the accompanying drawings in which similar letters and numerals of reference denote similar parts throughout the several views.

Figure 6:
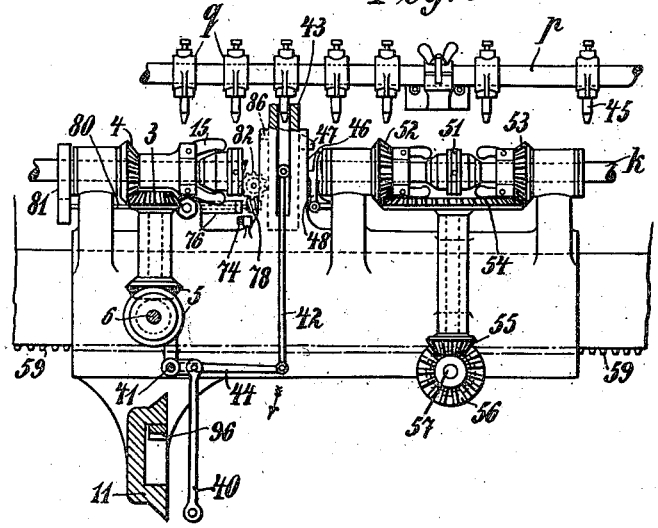
Figure 13:
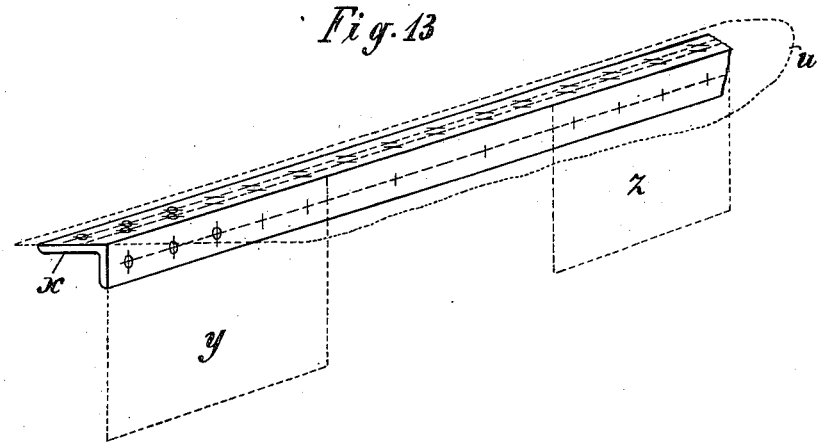
Figure 14:
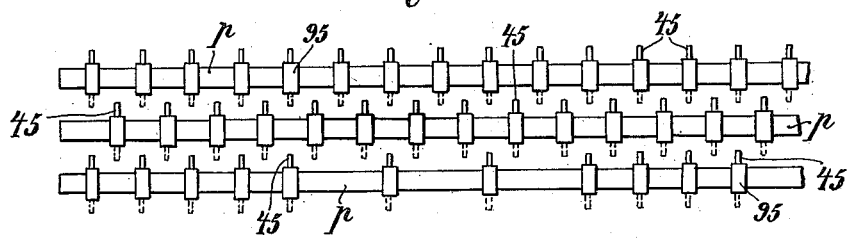

Figure 1 is a diagrammatic front view of one form of embodying the invention, Fig. 2 a section on line A—B of Fig. 1, Fig. 3 a section on line A—E of Fig. 1 drawn on a larger scale, Fig. 4 a plan of the main driving shaft and adjacent parts, Fig. 5 a diagrammatic plan of the driving mechanism for various parts of the machine, Fig. 6 a front view of the main driving shaft and the stops, Fig. 7 a view of the sleeves which coöperate with the stops, Fig. 8 a plan view of Fig. 7, Fig. 9 a side elevation partly in section of the adjusting sleeve and its connection with the coupling device of the main driving shaft, Fig. 10 a horizontal section on line H—K of Fig. 3, Fig. 11 a front view of a part of the drill and drill holder and the parts coöperating therewith, and Fig. 12 a detail view of the shaft and its bearings serving to move the drill up and down, Fig. 13 illustrates a piece of work consisting of an angle iron with plates and flat iron in connection therewith and Fig. 14 shows the rail provided with the stops, as it is adjusted to produce the desired series of holes, away from the machine and while the latter is running.

The drawing illustrates a drilling machine in which the work is clamped to the bed and the drill headstocks are adapted to move over the work.

At each end of the bed $a$ to which the piece of work $x$ is clamped (Fig. 3) a guideway $b$ is provided on which the standards $c$ are mounted to slide. These latter are moved and adjusted to the required position by means of screw spindles $e$ (Figs. 1, 2 and 5), the said spindles being simultaneously turned by hand or by machine power as desired (Fig. 5). As will be seen from Fig. 2, the standards $c$ are slotted as at $l$ throughout the greater part of their height, a carriage $d$ being guided in the said slots, extending across the bed and being vertically adjustable on screw spindles $g$, operated together by means of suitable gearing and shafts $f$ by hand or machine power. The whole carriage $d$ may then be raised and lowered at will together with all parts attached thereto. The bevel gears $g^1$ transmitting rotation from the shaft $f$ to the spindles $g$ are mounted to travel along the former to accommodate the movement of the standards $c$ along their guideways, the bevel gears traveling along keys of the shafts $f$.

The main driving shaft $k$ for the drilling mechanism $m$ (Fig. 1) is mounted on the carriage $d$ and derives its motion from a horizontal shaft $h$ driven from any suitable source of power, through the medium of a vertical shaft $i$ and bevel gearing. In this case also the bevel gearing transmitting motion from shaft $h$ to $i$ is adapted to follow the movement of the standard $c$ as will be readily understood, the bevel wheel moving on a long key of the shaft $h$. A similar connection is made between the bevel gears $j$ and the vertical shaft $i$ to enable these gears to follow the vertical movement of the carriage $d$. The shaft $k$ serves to operate all the automatic devices in connection with the machine.

A groove $n$ of T-shaped cross section extends across the carriage $d$ and bearings $o$ for the rail $p$ are adjustable therein. The rail $p$ is detachably mounted in the bearing $o$ and carries the set of adjustable and detachable stops $q$, which serve to arrest the drilling mechanisms in the exact, required positions. The stops $q$ consist of sleeves 95 fitting the rail $p$ and adapted to be fixed thereon by means of set screws or the like each sleeve having a downwardly projecting finger 45 with a tapered lower end for the purpose hereinafter set forth.

The carriage $d$ is provided with guideways over which the guide shoes 2 of the drilling machine engage. The latter is adapted to slide along the carriage $d$ and carries a slide 10 mounted on a dovetail guideway 11. This slide 10 is adapted to move toward and from the carriage $d$ and carries the drill holder 12 mounted in bearings 13, 14. The drill holder and with it the drill are driven from the shaft $k$ by means of a bevel gear 4 engaging a gear 3 mounted on a vertically disposed spindle, which transmits motion (Fig. 3) by means of bevel gears 5 to a horizontal shaft 6. This latter in its turn drives a gear 16 by means of two cog wheels 7 and 8, and the bevel gear 16 drives a bevel gear 9, mounted by means of a suitable key to slide vertically on the drill holder spindle 12. The drill spindle 12 is mounted to rotate in a sleeve 17 (Fig. 11) provided with a vertical rack 18 and coupled to the spindle 12 by means of a ring 19 so that the spindle 12 will follow the vertical movements of the sleeve. The ring 19 rests on a collar 20 loosely mounted on the spindle 12 but adapted to follow its vertical movements. A vertical rod 22 (Fig. 3) passes through the collar 20 and is adjustable in the same by means of a set screw 21. The rod 22 passes through a guide hole in an arm 23 mounted on the slide 10 and above the arm it is provided with a spring 24 which acts against a collar on the said rod 22 to normally press the rod upwardly. The rack 18 of the sleeve 17 is in engagement with a gear 25 (Fig. 11) which meshes with a gear 26 of a spindle 27 (Fig. 10). A worm wheel 28 is mounted on the spindle 27, which normally engages with a worm 29 (Fig. 12). The spindle 27 is also provided with a hand wheel 30 by means of which the vertical position of the drill spindle may be adjusted by hand if necessary. The worm 29 is mounted on a shaft 31 connected by means of a universal joint or the like with a shaft 32 and both these shafts are driven by means of belts 33 and 34 (Fig. 3) from a belt pulley 35 mounted to slide on the shaft 6. The worm 29 of the shaft 31 is normally held in engagement with the worm wheel 28 by means of a bell crank lever 36 (Fig. 11), which engages with its hook 37 under the end of a lever 38, the pivot of which is axially in line with the center line of the universal joint of the shafts 31, 32, so that shaft 31 will always have the same swing as the lever 38. The latter together with its projection 37 is drawn downwardly by means of a spring 39. The bell crank lever 36 extends with one arm into the path of movement of the rod 22, which is coupled to the drill spindle 12. When the lower end of the rod 22 strikes the free arm of the bell crank lever 36, this lever which is normally spring-held in the position shown in Fig. 11, will be moved so that its hook will release the projection 37 of the lever 38, so that the end of the said lever 38, which supports the shaft 31 will be swung downwardly by means of the spring 39, and the worm 29 will be disengaged from the worm wheel 28, as will be seen from Figs. 3 and 10 to 12 inclusive. A rod 40 is linked to the lever 38, which extends upwardly and is connected to one arm of the rocking shaft 41. This rock shaft 41 has keyed to it a lever 44 (Fig. 6), which is linked to the rod 42, the upper end of which is attached to a vertically reciprocatory centering bolt 43.

The bolt 43 (Fig. 4) is provided with an oval recess at the top, which coöperates with the stops $q$. The smaller diameter of this oval recess of the centering bolt 43 fits exactly over the finger 45 of the stop, so that when the parts are brought into connection, the finger 45 of the stop will center the bolt exactly on the same. The bolt 43 slides in a sleeve 46 and the pin connecting the said bolt to the rod 42 extends through a vertical slot in the said sleeve. The bolt 43 is provided with a tappet 47 which extends through a vertical slot in the sleeve 46. In the path of movement of the tappet 47 (Fig. 9) a pawl 48 pivoted to an angle lever 49 is adapted to extend and is held against the sleeve 46 by means of a spring. The angle lever 49 is also provided with a spring which has a tendency to raise the arm of the said angle lever, which is pivoted to the pawl 48. A rod 50 is linked to the upper end of the angle lever 49, the opposite end of which is attached to a coupling clutch 51. The latter slides on the shaft $k$ and may be moved from its disengaged position to engage the clutch on the bevel wheel 52 or the bevel wheel 53. Normally the clutch is in the position illustrated in Fig. 6 and out of engagement, so that it will merely rotate with the shaft $k$ without turning either of the bevel gears 52, 53. The coupling clutch as also the gears 52 and 53 are adapted to slide on a shaft $k$ and the wheels and their couplings are mounted on arms of the drill head-stop, so that all these parts will follow the movement of the drilling machine along the shaft $k$. The bevel gears 52 and 53 are both in engagement with a horizontal bevel gear 54 (Figs. 4 and 6), which is mounted on a vertical shaft. This shaft, which is also mounted in the frame of the drilling mechanism, has a bevel gear 55 mounted at its lower end, which meshes with a gear 56 of a horizontal shaft 57. This latter shaft, which is also mounted in the frame of the drilling mechanism extends beneath the carriage $d$ and at about the center of the latter is provided with a gear 58 (Fig. 3), which engages a rack 59 extending along the length of the carriage $d$, a slot being provided in the drill frame through which the said gear extends. When one of the gears 52 or 53 is coupled by the clutch 51, the gear 58 will be turned by means of a shaft $k$ and gearing 54, 55, 56, 57, so that the frame of the drilling machine will be moved along the carriage in one direction or the other, according to which gear 52 or 53 is engaged by the said clutch 51. A double-arm lever 60, pivotally mounted at 61 is linked to the clutch 51 and extends upwardly into the path of movement of a stop 62 (Fig. 9) mounted on the rail $p$ and this lever 60 serves to draw the clutch 51 into engagement with the clutch of the gear 53, when the drilling machine has reached the end of its operative path, i. e. when it has passed the proper predetermined number of stops $q$. This operation of the coupling to couple the gear 53 to the shaft $k$ has the effect of moving the whole drilling mechanism to the left (Fig. 1) i. e. it returns the mechanism to its initial position. The centering bolt 43 is further provided with a tappet 63, which is about at right angles to the tappet 47 and also extends through a slot in the sleeve 46 (Fig. 7). The tappet 63 lies somewhat higher than 47 and extends into the path of movement of the lever 64, which is mounted to swing on a carrier arm extending from the sleeve 46. Mounted in the same carrier arm by the aid of a collar 68 is a vertical shaft 67 (Figs. 7 and 8). The double-arm lever 64 is linked by means of a rod 65 to a collar 66 mounted on a sleeve $66^a$ which is vertically movable on the shaft 67 and carries a horizontally extending lever 69. The sleeve $66^a$ is keyed to the shaft 67, so that when the lever 69 is turned, the shaft 67 will also be turned, while the collar will turn on the sleeve $66^a$ so that the link 65 will remain in proper connection with the double-arm lever 64. Normally the rod 65 and with it the lever 69 are held down by a spring 70, so that the lever 69 will be out of the way of the projection 71 of the stop $q$.

A lever 72 is keyed to the lower end of the shaft 67 and rocks with it, said lever being connected by a spring 73 to a bell crank lever 74 the free end of which engages under an arm 75 of a lever bearing 76 pivotally supported on the drill frame at 77 and normally pressed downwardly by means of a spring 87. The spindle of a worm 78 is mounted in the bearing lever, the said spindle being connected by means of a universal joint or the like 79 with a shaft 80 mounted in stationary bearings and driven by a belt 81 from a belt pulley on the shaft $k$ (Fig. 4). Normally the end of the shaft carrying the worm 78 is lowered so that the worm is not in engagement with the worm wheel 82. The worm engages the worm wheel only when the shaft 67 has been turned so as to raise the bearing lever 76 by means of the bell crank lever 74. The worm wheel 82 is mounted on the same shaft as the gear 83 which meshes with a rack 84 mounted on the centering bolt 43 (Fig. 9). The rack 84 projects through a slot of the housing 46 to enable the gear 83 to engage it. The shaft of the worm 78 is retained in its raised position by means of the hook of a lever 85 which engages under a projection of the bearing lever 76. The upper end of the lever 85 is bent toward the centering bolt and it extends into the path of movement of the projection 86 of the said bolt. This projection is advantageously set at right angles to the tappet 63 and also extends through a slot of the sleeve 46. The projection 86 strikes the upper end of the lever 85 when the centering bolt moves upwardly and rocks the said lever so that the hook at its lower end releases the bearing lever 76, which falls under the influence of its spring 87 and thus disengages the worm 78 from the worm wheel 82.

In boring holes in angle and other irons, it is of great importance that the holes are bored at a certain distance from the edge of the work or from the back of the angle. Assuming the work to be clamped and the drilling mechanism to be rigid in its movement to and from the work, this dimension, i. e. the distance between the edge of the work and the center of the hole would vary if the angle iron or other piece of work were not exactly straight. In many cases the iron or other rolled metal is not quite straight so that the distance of the center of the holes from the work would not always be accurate. In order to compensate any inaccuracies in this respect, the slide 10 carrying the drill spindle is adjustable on the guides 11, in a measure which is dependent on the edge of the work in question from which the distance of the holes to be bored is measured. With this object in view, one of the guides 11 is provided with a rack 96 (Fig. 3) in which a gear 100 (Fig. 10) engages, which is mounted on a shaft 97.

The shaft 97 is mounted in the slide 10 and carries, loosely mounted thereon a lever 93 while a handwheel 91 is keyed to the said shaft. If the hand wheel 91 is turned the gear 100 on the shaft 97 will coöperate with the rack 96 and thus adjust the position of the slide 10 with the whole drilling mechanism, which movement of the mechanism will be enabled by the sliding mounting of all the power transmitting members on their respective shafts. The lower part of the slide 10 is developed to the form of a disk 98 which is inclosed in a casing 99 adapted to be clamped to the said disk by means of a set screw. The casing carries an arm 99$^a$ having a vertically adjustable spindle 99$^b$ therein carrying a roll 90 at the lower end thereof adapted to run along the edge of the angle iron or other work being done. The roll is horizontally adjustable on the arm 99$^a$ by means of a screw spindle 90$^a$. When the machine commences working the roll 90 is adjusted to the distance of the holes from the edge of the work. Owing to the arrangement of the disk 98 and the housing 99 the guide roll 90 may be swung around the axis of the drill spindle and may thus be adapted to engage the opposite side of the work or to engage the same side of the piece of work, when the latter is clamped in the opposite way as indicated in dotted lines in Fig. 3.

The lever 93 of the spindle 97 is loaded with a weight and also provided with a hook 92 by means of which it may be clamped to the hand wheel 91 as will be readily understood on reference to Fig. 10.

This lever may also be swung over into the opposite position to that shown in Fig. 10 if the piece of work is clamped in the position shown in dotted lines in Fig. 3, in which case the guide roll 90 may be required to engage the opposite side of the work. The weight of the lever 93 will always hold the guide roll against the edge of the work and if the piece of work is not quite straight, the weighted lever 93 will cause the hand wheel 91 to turn and with it the shaft 97, so that the slide 10 and with it the whole drilling mechanism will be correspondingly adjusted by means of the gear 100 coöperating with the rack 96. Thus the distance of the center of the drill from the edge of the work will always be kept constant.

The operation of the machine will now be described:—The rail $p$ is first fitted outside the machine with all the stops $q$, necessary for drilling a complete piece of work as shown at Fig. 13, the stops $q$ being clamped by means of their sleeves 95 with the fingers 45 pointing downwardly, the proper distance apart to secure the holes being bored at the required distances apart (Fig. 14). A second rail is then laid next to the one which has been prepared, the fingers of the same being in a certain predetermined relation to those of the first rail. When the second rail has been adjusted, the first one may be turned over 180° so as to bring its fingers 45 opposite those of the second rail (shown in dotted lines in Fig. 14) when the distance apart of the two sets of fingers can be easily and accurately controlled by measurement in relation to each other. This method is repeated for the third and following rails i. e. rows of holes. Thus a complete representation of the whole location of the various rivet or other holes is obtained. It can be seen at a glance how many holes occur in one and the same cross section of the most complicated bridge girder work, which is of great importance. The whole work can be controlled by the foreman and he will be sure that the holes will be bored in accordance with the stops on the various rails. Then the rail $p$ is attached to the carriage $d$ so that the fingers 45 point vertically downward. The work $x$ is then clamped to the table $a$ and the standards $c$ are adjusted on the bed $b$ so that the drill spindle 12 of the drilling mechanism is properly adjusted over the work. The guide roll 90 for the work is then adjusted to correspond to the distance at which the holes are to be bored from the edge of the angle iron or other work and the slide 10 with the drill spindle is adjusted by means of the hand wheel 91, so that the drill will enter the work at the exact position required. The hand wheel 21 is now coupled to the loaded lever 93 by means of the hook 92 and its butterfly-nut, so that the guide roll 90 will automatically follow the back edge of the angle iron and will thus automatically determine the proper distance of the holes from the web. It is now only necessary for the attendant to start the machine; the shaft $k$ commences to rotate and the drilling mechanism $m$ will drill all the holes in the work $x$, which have been predetermined by the position of the stops $q$ on the roll $p$. The rotation of the shaft $k$ sets the drill spindles 12 running and at the same time operates the belt driving gear 35, 34, 33, the two shafts 32, 31, the worm wheel 29 and the gearing of the same 28, 26 and 25 to gradually lower the said spindle 12, since the gear 25 engages the rack 18 and the drill spindle is so connected that it must follow the movement of this rack and of the sleeve 17 in a vertical direction, while the drill spindle is performing this work. The centering bolt 43 is in the position shown in Fig. 1 in which it embraces the finger 45 of the first stop $q$. When the drill has finished the hole in the work corresponding to the first stop $q$ and has reached its lowest position, the rod 22 (Fig. 11) connected to the drill spindle 12 strikes the bell crank lever 36 and moves its hook from underneath the projection 37 of the supporting lever 38, so that the lever 38 and with it the shaft of the worm 29 will swing downwardly under the influence of the spring 39. Thus the worm 29 will be disengaged from the worm wheel 28 and the rotation of the gear 25 will be interrupted. The drill spindle will consequently cease its downward movement and the gears 28, 26 and 25 will be disengaged, so that the drill spindle may be raised to its initial position by the action of the spring 24 on the rod 22. The downward movement of the lever 38 also causes the shaft 41 to rock by means of the rod 40, Fig. 11, so that owing to the connection of this shaft to the bolt 43 by means of the levers 44 and 42 the bolt is drawn downwardly. The bolt 43 thus releases the finger 45 of the first stop $q$ and is in the position illustrated in Fig. 7. As the bolt 43 descends the tappet 47 strikes the lever 48 and causes the bell crank lever 49 to swing on its pivot, so that the rod 50 will pull the clutch 51 into the position shown in Fig. 9, and the shaft $k$ will now rotate the shaft 57 by means of the wheels 52, 54, 55 and 56 (Fig. 6). The gear 58 will be turned with the shaft 57 and engages the rack 59 (Fig. 3) of the carriage $d$ so that the whole drilling mechanism will be moved along the carriage $d$ to the right (Fig. 1). This movement continues automatically until the centering bolt 43 has passed under the finger 45 of the second stop $q$. When the bolt 43 moves downward, the tappet 63 engages one end of the lever 64 but not until the tappet 47 has started the lateral movement of the drilling mechanism along the carriage $d$ (Figs. 7 and 9). The effect of the tappet 63 operating the lever 64 is to raise the lever 69, which now assumes the position illustrated in Fig. 7 and on the movement of the carriage strikes the lug 71 of the stop $q$. This causes the lever 69 and with it the shaft 67 and the lever 72 to be turned so that the angle lever 74 of the supporting lever 76 and with it the shaft of the worm 78 (Fig. 8) will be raised. This causes the worm 78 to engage the worm wheel 82 and since the worm 78 is rotated from the shaft $k$ by the belt gearing 81 (Fig. 4), this mechanism acts to raise the bolt 43 by means of the gear 83 and rack 84 (Fig. 9). When the supporting lever 76 and the worm 78 are raised, the projection of the supporting lever passes over the hook of the lever 85 so that the worm 78 is supported in proper engagement with the worm wheel. During the upward movement of the bolt 43 the tappet 86 of the same strikes the upper end of the inwardly turned lever 85 swinging the same on its pivot, whereby its lower end is swung and releases the lever 76 and the spring 87 forces the worm 78 downwardly out of engagement with its worm wheel, so that the further upward movement of the bolt 43 ceases. As the bolt commenced its upward movement, the tappet 63 releases the lever 64 so that the lever 69 descends during the upward movement of the bolt, so that on the next following drilling operation, this lever will be out of the way of the lug 71 on the stop $q$. At the upward movement of the bolt 43, the tappet 47 releases the lever 48 so that the spring operates the angle lever 49 to cause the rod 50 and simultaneously also the coupling clutch 51 to return to its central position between the two gears 52 and 53 (Fig. 9). This movement of the coupling 51 has the effect of stopping the movement of the drilling mechanism on the carriage $d$ and since the stoppage of this movement depends on the lever 69 striking the lug 71 of the stop $q$, which is now operative, the drilling mechanism will have its proper position on the carriage $d$ as this position is determined by the stop $q$. Thus, as the centering bolt 43 moves upwardly, it will slide over the finger 45 and since the diameter of this finger corresponds exactly to the smaller diameter of the oval orifice in the centering bolt, the whole drilling mechanism will be accurately adjusted as regards the stop. As soon as the bolt 43 has attained its highest position, it will have brought the worm 29 into engagement with the worm wheel 28 by means of the lever system 42, 44, 41 and 40, so that as the drill spindle now recommences to rotate, a downward movement of the same may also take place. Thus, the second hole will now be bored, its position being determined by the second stop $q$. The above described operation will of course be repeated at the third and other stops until the machine has moved far enough to bring the lever 60 (Fig. 9) against the stop 62 of the rail $p$. When the lever 60 strikes the stop 62 it will be swung around and will act to throw the coupling clutch 51 into its inoperative position so that the lateral movement of the drilling mechanism $m$ will be properly limited. The stops 62 might be mounted on a special rail, if desirable.

As already mentioned, all the gears on the shaft $k$, by means of which the various mechanisms derive their movement from the shaft, are axially movable on the same. Since the coupling clutch 51 is also in engagement when the boring mechanism is moved along the carriage $d$, the said clutch will follow the movement of the machine exactly without being disengaged by such movement.

As illustrated in Fig. 1, several mechanisms may be mounted on the carriage $d$ which may be arranged similar to the drilling mechanism hereinbefore described, and which may operate quite independently of each other on one and the same piece of work, so that the capacity of the machine will be very considerably increased.

The guide roll 90 presses against the back of the angle iron (Fig. 3) and follows this edge of the work even if the latter is curved or not quite accurately straight. Since, as will be seen from the above explanation, the drill spindle 12 is accurately adjusted as regards the roll 90, this latter roll will have the effect of accurately controlling the position of each of the holes relatively to the edge of the work. It will be readily understood that this guide roll 90 could be made to run along the edge of any kind of work, such as girders, U-iron and the like. After all the holes have been properly drilled in the piece of work, each drilling mechanism, i. e., the lateral movement of the same, will stop automatically and this was effected, as already described, by the aid of the stop 62 and the lever 60, which act to throw the coupling clutch 51 into its inoperative position. A further effect of this action is that by means of the rod 50, of the angle lever 49 and the pawl 48, the bolt 43 was slightly raised. This short upward movement of the bolt 43 causes the tappet 63 to release the lever 64 so that the lever 69 could be drawn down by means of the spring 70 and the rod 65 out of the path of movement of the lug 71 (Fig. 7.) The bolt 43 is retained in this position by a suitable support or the like and the pawl 48 is disengaged from the tappet 47 by hand in the machine illustrated, so that it may move freely upwardly and the lever 60 is moved by hand to the left. The movement of this lever causes the coupling clutch 51 to move in the opposite direction i. e., to the right, until it is in engagement with the clutch of the gear 53, whereupon the bevel gear 54 and furthermore, the gears 55 and 56 and the gear 59 on the shaft 57 will be turned in the opposite direction. This movement of the parts has the effect of moving the whole drilling mechanism $m$ along the carriage $d$ until it has regained its initial position, in which the lever 60 will again engage with its original stop 62 in order to move the clutch 51 into its inoperative position. Thus it will be seen that each drilling mechanism will work along the space between two stops 62 so that each of these latter stops represents the end of the work of one drilling mechanism and commencement of that of the next with the exception of the two end stops, one of which effects the commencement of the drilling operation and the other the completion of the same. When all the drilling mechanisms have finished their work on the metal and have returned to their initial positions, the piece of angle iron $x$ is taken out of the machine and other work substituted therefor, as will be readily understood. When the pieces of work are to be drilled in the same manner, the rail $p$ remains clamped in the machine. The standards $c$ are moved backward on the machine bed $b$ so that the drill spindles 12 and with them, of course, the drills are caused to move for the time being above the center of the table $a$. The plates $y$, $z$, &c., are then placed on the table $a$ (Fig. 13) and the stops $q$ are correctly adjusted, whereupon the drilling mechanisms are again set in motion and the whole operations are repeated until all the plates have been properly drilled.

If instead of the plates $y$ $z$, &c., a strip of flat iron is to be drilled, this latter is properly screwed down on to the table $a$, it will be readily understood that several sorts of rolled metal, as for instance, girders, U-iron, &c., may be properly adjusted on the table and automatically drilled, with which object in view the carriage $d$ is also adjustable vertically on the standards $c$.

By means of the present machine and its mode of operation, it will be readily understood that the holes of the various work of the constructions to be attained will necessarily all fit exactly over each other, so that there will be no necessity of adjusting them by subsequent drilling or the like, which constitutes a great advantage.

It is a great advantage of the present system, that the rails $p$ of the machine can be fitted up outside the machine, so that the latter works uninterruptedly, which also effects great economy. The interchangeability of the rails and the adjustment of the whole mechanism is so simple that it may be combined with the changing of the piece of work, thus avoiding loss of time. Instead of the second drilling mechanism illustrated in Fig. 1 a single one might, of course, be employed or several more could also be arranged. It is, of course, self-evident that instead of the drilling device, punching or stamping mechanism might be employed. Instead of allowing the drilling machine to travel along the main driving shaft, this mechanism could be arranged stationary and the centering bolts could be mounted on the table, to which the piece of work is attached. In this case, the work table would have to be movable, similar mechanism being employed to coöperate with the stops $q$ to stop the table at the desired position.

I claim as my invention:—

1. In a machine of the class specified, a vertically and horizontally adjustable carriage and a rail with adjustable stops detachably mounted on the same, a machine tool mounted to travel along the said carriage, means for automatically stopping and starting the working of the said tool, means for automatically stepwise moving the said tool from one of the said stops to the next between the periods of working and means for supporting the work beneath the said tool.

2. In a machine of the class specified, a vertically and horizontally adjustable carriage and a rail with adjustable stops detachably mounted on the same, a machine tool mounted to travel along the said carriage, means for automatically stopping and starting the working of the said tool, means for automatically stepwise moving the said tool from one of the said stops to the next between the periods of working, means for automatically returning the tool to its initial position after it has passed a certain predetermined number of the said stops and means for supporting the work beneath the said tool.

3. In a machine of the class specified, a vertically and horizontally adjustable carriage and a rail with adjustable stops detachably mounted on the same, a machine tool mounted to travel along the said carriage, means for automatically stopping and starting the working of the said tool, means for automatically stepwise moving the said tool from one of the said stops to the next between the periods of working, means for automatically controlling the distance of the point of application of the tool to the work, from one edge of the piece of work and means for supporting the work beneath the said tool.

4. In a machine of the class specified, a vertically and horizontally adjustable carriage and a rail with adjustable stops detachably mounted on the same, a machine tool mounted to travel along the said carriage, means for automatically stopping and starting the working of the said tool, means for automatically stepwise moving the said tool from one of the said stops to the next between the periods of working, means for automatically returning the tool to its initial position after it has passed a certain predetermined number of the said stops, means for automatically controlling the distance of the point of application of the tool to the work from one edge of the piece of the work and means for supporting the work beneath the said tool.

5. In a machine of the class specified, a vertically and horizontally adjustable carriage and a rail with adjustable stops detachably mounted on the same, a machine tool mounted to travel along the said carriage, means for automatically stopping and starting the working of the said tool, a vertically downwardly extending finger on each of said stops, a vertically guided centering bolt to move with the tool, means for raising the same to engage over the said stop-finger after the tool has been stepwise moved and before it commences to operate on the work, means for automatically moving the said tool from one of the said stops to the next and means for supporting the work beneath it.

6. In a machine of the class specified, a vertically and horizontally adjustable carriage and a rail with adjustable stops detachably mounted on the same, a machine tool mounted to travel along the said carriage, means for automatically stopping and starting the working of the said tool, a vertically downwardly extending finger on each of said stops, a vertically guided centering bolt to move with the tool, means for raising the same to engage over the said stop-finger after the tool has been stepwise moved and before it commences to operate on the work, means for automatically disengaging the said centering bolt from the said finger after the work has been finished, means for automatically moving the said tool from one of the said stops to the next and means for supporting the work beneath it.

7. In a machine of the class specified, a vertically and horizontally adjustable carriage, and a rail with adjustable stops detachably mounted on the same, a machine tool having a frame mounted to slide along said carriage, and also movable to and from the said carriage, means for automatically stopping said tool frame at each of the said stops consecutively, means for automatically starting the tool to work after each stoppage, and for automatically stopping it at the completion of the work, means for intermittently moving the said tool frame from one stop to the next between the working periods, adjustable means for positively controlling the distance of the said tool frame from the longitudinal edge of the work and means for supporting the work beneath the said tool frame.

8. In a machine of the class specified, a vertically and horizontally adjustable carriage, and a rail with adjustable stops detachably mounted on the same, a machine tool having a frame mounted to slide along said carriage, and also movable to and from the said carriage, a downwardly projecting finger on each of the said stops, a vertically movable centering bolt mounted on said tool frame means for automatically stopping the said tool frame at each of the stops consecutively, means for automatically raising the said centering bolt to engage the said stop-finger after each stoppage of the said tool frame and means operated by the vertical movement of the said centering bolt to start the operation of the tool after the said bolt has properly engaged the said stop finger.

9. In a machine of the class specified, a vertically and horizontally adjustable carriage, and a rail with adjustable stops detachably mounted on the same, a machine tool having a frame mounted to slide along said carriage, and also movable to and from the said carriage, a downwardly projecting finger on each of the said stops, a vertically movable centering bolt mounted on said tool frame, means for automatically stopping the said tool frame at each of the stops consecutively, means for automatically raising the said centering bolt to engage the said stop-finger after each stoppage of the said tool frame, means operated by the vertical movement of the said centering bolt to start the operation of the tool after the said bolt has engaged the said finger and means operated by the descending tool to stop the said tool automatically after the completion of its work.

10. In a machine of the class specified, a vertically and horizontally adjustable carriage, and a rail with adjustable stops detachably mounted on the same, a machine tool having a frame mounted to slide along said carriage, and also movable to and from the said carriage, a downwardly projecting finger on each of the said stops, a vertically movable centering bolt mounted on said tool frame, means for automatically stopping the said tool frame at each of the stops consecutively, means for automatically raising the said centering bolt to engage the said stop-finger after each stoppage of the said tool frame and means operated by the vertical movement of the said centering bolt to start the operation of the tool after the said bolt has properly engaged the said stop finger, and to initiate the movement of the said tool frame along the carriage after the tool has completed its work.

11. In a machine of the class specified, a vertically and horizontally adjustable carriage, and a rail with adjustable stops detachably mounted on the same, a machine tool having a frame mounted to slide along said carriage, and also movable to and from the said carriage, means for automatically stopping said tool frame at each of the said stops consecutively, means for automatically starting the tool to work after each stoppage, and for automatically stopping it at the completion of the work, means for intermittently moving the said tool frame from one stop to the next between the working periods, means mounted on the said stop rail and coöperating means mounted on the tool frame to stop the said tool frame and return it to its initial position after it has passed a certain predetermined number of stops.

12. In a machine of the class specified, a vertically and horizontally adjustable carriage and a rail with adjustable stops detachably mounted on the same, a machine tool mounted to travel along the said carriage, means for automatically stopping and starting the working of the said tool, means for automatically stepwise moving the said tool from one of the said stops to the next between the periods of working, a driven shaft mounted on the said carriage and means for operating all the said automatic devices from the same.

In testimony whereof I have affixed my signature in the presence of two witnesses.

ANTON KOLASSA.

Witnesses:
 HUGO P. PREPPA,
 AUGUST KOLASSA.